United States Patent
Ohori et al.

(10) Patent No.: US 11,181,061 B2
(45) Date of Patent: Nov. 23, 2021

(54) CONTROL APPARATUS FOR INTERNAL COMBUSTION ENGINE

(71) Applicant: TOYOTA JIDOSHA KABUSHIKI KAISHA, Toyota (JP)

(72) Inventors: Shinya Ohori, Miyoshi (JP); Chisa Watanabe, Okazaki (JP); Yuki Ikejiri, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/890,145

(22) Filed: Jun. 2, 2020

(65) Prior Publication Data
US 2021/0087989 A1   Mar. 25, 2021

(30) Foreign Application Priority Data
Sep. 19, 2019   (JP) .............................. JP2019-170210

(51) Int. Cl.
| | |
|---|---|
| *F02D 41/02* | (2006.01) |
| *F02P 5/15* | (2006.01) |
| *F02D 41/22* | (2006.01) |
| *F02D 41/06* | (2006.01) |

(52) U.S. Cl.
CPC ....... *F02D 41/0255* (2013.01); *F02D 41/064* (2013.01); *F02D 41/22* (2013.01); *F02P 5/1506* (2013.01)

(58) Field of Classification Search
CPC ........... F02D 41/064; F02D 2200/0802; F02D 41/0255; F02D 41/062
See application file for complete search history.

(56) References Cited

U.S. PATENT DOCUMENTS

| | | | | |
|---|---|---|---|---|
| 9,925,974 | B2 * | 3/2018 | Leone | B60W 20/13 |
| 2002/0056268 | A1 * | 5/2002 | Isobe | F02D 41/0255 |
| | | | | 60/277 |
| 2003/0212484 | A1 * | 11/2003 | Takebayashi | F02D 41/047 |
| | | | | 701/114 |
| 2007/0084425 | A1 * | 4/2007 | Hirose | F02D 13/0226 |
| | | | | 123/90.1 |
| 2013/0173145 | A1 * | 7/2013 | Yasuda | F02N 19/00 |
| | | | | 701/113 |
| 2013/0282262 | A1 * | 10/2013 | Takahashi | F02N 19/00 |
| | | | | 701/113 |

FOREIGN PATENT DOCUMENTS

| | | |
|---|---|---|
| JP | 2001-132526 A | 5/2001 |
| JP | 2007-170363 A | 7/2007 |

* cited by examiner

*Primary Examiner* — Sizo B Vilakazi
(74) *Attorney, Agent, or Firm* — Oblon, McClelland, Maier & Neustadt, L.L.P.

(57) ABSTRACT

A control apparatus performs a diagnosis process for determining whether or not catalyst warm-up control is abnormal by determining whether or not an ignition timing that is set during the performance of catalyst warm-up control is a timing advanced by a threshold or more. The threshold is a value that is set to a timing more advanced than the ignition timing that is set during the performance of catalyst warm-up control by a predetermined margin. The control apparatus performs a setting process for setting the threshold based on a start-up coolant temperature such that the margin becomes larger when the start-up coolant temperature is low than when the start-up coolant temperature is high.

3 Claims, 3 Drawing Sheets

CONTROL APPARATUS FOR INTERNAL COMBUSTION ENGINE

INCORPORATION BY REFERENCE

The disclosure of Japanese Patent Application No. 2019-170210 filed on Sep. 19, 2019 including the specification, drawings and abstract is incorporated herein by reference in its entirety.

BACKGROUND

1. Technical Field

The disclosure relates to a control apparatus for an internal combustion engine.

2. Description of Related Art

A catalyst device for exhaust gas control that is provided in an exhaust passage of an internal combustion engine performs an exhaust gas control function thereof by being heated up to a predetermined activation temperature. Thus, at the time of cold start-up when the temperature of the catalyst device is low, catalyst warm-up control for activating the catalyst device at an early stage by correcting an ignition timing through retardation to raise the temperature of exhaust gas is performed.

It should be noted herein that with a view to diagnosing whether or not an ignition timing command value that is set by a control apparatus is set to a value suitable for warm-up of the catalyst device, in other words, whether or not the temperature of the catalyst device is actually raised, it is determined that catalyst warm-up control is abnormal when the ignition timing that is set during warm-up of a catalyst is a timing advanced by a threshold set in advance or more, in an apparatus described in, for example, Japanese Patent Application Publication No. 2001-132526 (JP 2001-132526 A).

SUMMARY

By the way, the aforementioned threshold is a value that is set to a timing more advanced than an ignition timing that is set during the performance of catalyst warm-up control by a predetermined margin. When the margin is not appropriately set, it may be erroneously diagnosed that catalyst warm-up control is abnormal even in the case where catalyst warm-up control is not abnormal.

A control apparatus for an internal combustion engine for solving the aforementioned problem performs catalyst warm-up control for promoting warm-up of a catalyst device provided in an exhaust passage by correcting through retardation an ignition timing that is set based on an engine operating state by a retardation correction amount that is set based on a start-up coolant temperature of an internal combustion engine, at a time of cold start-up of the engine, and performs a diagnosis process for determining whether or not the catalyst warm-up control is abnormal by determining whether or not the ignition timing that is set during performance of the catalyst warm-up control is a timing advanced by a threshold or more. Moreover, the threshold is a value that is set to a timing more advanced than the ignition timing that is set during performance of the catalyst warm-up control, by a predetermined margin. Moreover, the control apparatus performs a setting process for setting the threshold based on the start-up coolant temperature such that the margin becomes larger when the start-up coolant temperature is low than when the start-up coolant temperature is high.

When the start-up coolant temperature is low, the warm-up of the catalyst device by exhaust gas immediately after start-up of the engine is less likely to progress than when the start-up coolant temperature is high, but the catalyst device eventually reaches the activation temperature thereof due to exhaust gas, and purifies this exhaust gas. It should be noted herein that the possibility of erroneously diagnosing that catalyst warm-up control is abnormal is higher in the case where the aforementioned margin at the time when the start-up coolant temperature is low is made equal to the aforementioned margin at the time when the start-up coolant temperature is high than in the case where the aforementioned margin at the time when the start-up coolant temperature is low is made larger than the aforementioned margin at the time when the start-up coolant temperature is high, although the ignition timing is retarded through catalyst warm-up control under a low-temperature environment. Thus, in this configuration, the threshold is set such that the aforementioned margin becomes larger when the start-up coolant temperature is low than when the start-up coolant temperature is high. Therefore, it can be restrained from being erroneously diagnosed that catalyst warm-up control is abnormal under a low-temperature environment.

Incidentally, in the case where the ignition timing is retarded by a large value when the start-up coolant temperature is low, the combustion of an air-fuel mixture becomes unstable. Meanwhile, even in the case where the ignition timing is retarded by a large value when the start-up coolant temperature is high, the combustion of the air-fuel mixture is unlikely to become unstable. It is thus advantageous to retard the ignition timing by a large value from the standpoint of warming up the catalyst device at an early stage. Thus, it is preferable to set the retardation correction amount such that the ignition timing is retarded by a larger value when the start-up coolant temperature is high than when the start-up coolant temperature is low.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
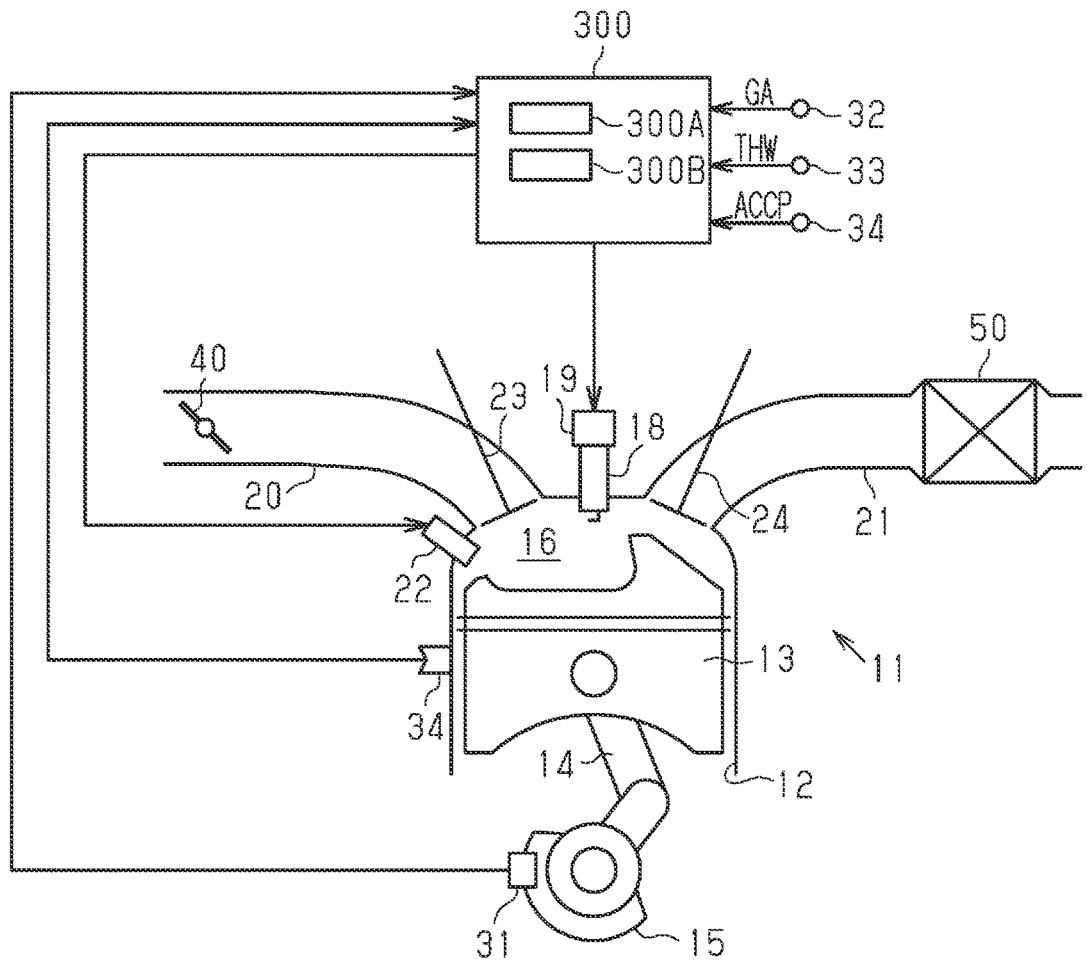
FIG. 1 is a schematic view showing the configuration of an internal combustion engine to which a control apparatus for the internal combustion engine according to one of the embodiments is applied.

One of the embodiments as a concretization of a control apparatus for an internal combustion engine will be described hereinafter with reference to FIGS. 1 to 3. As shown in FIG. 1, an internal combustion engine 11 is provided with a plurality of cylinders 12 (only one of which is shown in FIG. 1). A piston 13 that moves in a reciprocating manner is installed in each of the cylinders 12. The piston 13 is coupled to a crankshaft 15 as an output shaft of the internal combustion engine 11 via a connecting rod 14. Reciprocating motion of the piston 13 is converted into rotary motion of the crankshaft 15 by the connecting rod 14.

A combustion chamber 16 is formed above the piston 13 in the cylinder 12. A fuel injection valve 22 for in-cylinder injection that directly injects fuel into the combustion chamber 16 is attached to a cylinder head of the internal combustion engine 11. Incidentally, a fuel injection valve that injects fuel into an intake port may be installed as the fuel injection valve of the internal combustion engine 11.

An ignition plug 18 that ignites an air-fuel mixture consisting of fuel and air is attached to an upper portion of the combustion chamber 16. An igniter 19 that applies a high voltage for ignition is connected to the ignition plug 18.

An intake port and an exhaust port communicate with the combustion chamber 16. The intake port is opened/closed by an intake valve 23, and the exhaust port is opened/closed by an exhaust valve 24. The intake port is connected to an intake passage 20, and a throttle valve 40 that adjusts an amount of intake air is provided in the intake passage 20. The exhaust port is connected to an exhaust passage 21, and a catalyst device 50 that purifies exhaust gas components is provided in the exhaust passage 21.

A control apparatus 300 performs various kinds of control of the internal combustion engine 11. The control apparatus 300 is equipped with a central processing unit (hereinafter referred to as a CPU) 300A, a memory 300B in which programs for control and data are stored, and the like. Moreover, the control apparatus 300 performs processes regarding the various kinds of control through the execution of the programs stored in the memory 300B by the CPU 300A.

A crank angle sensor 31 that detects a crank angle of the crankshaft 15, an airflow meter 32 that detects an intake air amount GA of the internal combustion engine 11, a coolant temperature sensor 33 that detects a coolant temperature THW as a temperature of coolant in the internal combustion engine 11, and an accelerator position sensor 34 that detects an accelerator operation amount ACCP as an operation amount of an accelerator pedal are connected to the control apparatus 300. Moreover, signals from the various sensors are input to the control apparatus 300. Incidentally, the control apparatus 300 calculates an engine rotational speed NE based on an output signal of the crank angle sensor 31. Besides, the control apparatus 300 calculates an engine load factor KL based on the engine rotational speed NE and the intake air amount GA.

Moreover, the control apparatus 300 grasps an engine operating state based on detection signals of the aforementioned various sensors, and performs various kinds of engine control such as fuel injection control of the fuel injection valve 22, ignition timing control of the ignition plug 18, and the like in accordance with the grasped engine operating state.

The control apparatus 300 calculates a basic ignition timing ABASE based on the engine rotational speed NE, the engine load factor KL, and the like. Incidentally, it is assumed in the following description that a compression top dead center TDC is "0", that an ignition timing that is set before the compression top dead center is a positive value, and that an ignition timing that is set after the compression top dead center is a negative value. Accordingly, the value of the ignition timing increases as the ignition timing is set toward an advancement side. Besides, a retardation amount of the ignition timing is a negative value that changes the ignition timing toward a retardation side. The ignition timing is changed further toward the retardation side as the value of the ignition timing decreases, namely, as the absolute value of the ignition timing increases. Incidentally, in the following description, by mentioning that the retardation amount is large, it is meant that the absolute value of the retardation amount is large.

The smaller one of an MBT ignition timing AMBT and a knock limit ignition timing AKNOK, namely, a value on the retardation side is set as the basic ignition timing ABASE. The MBT ignition timing AMBT is a maximum torque ignition timing as an ignition timing when a maximum torque can be obtained on a current engine operating condition. The knock limit ignition timing AKNOK is an advancement limit timing as an ignition timing when the level of knocking can be confined within a permissible range under the best possible condition. Basic values of the MBT ignition timing AMBT and the knock limit ignition timing AKNOK are calculated based on the current engine rotational speed NE, the current engine load factor KL, and the like. Then, a final MBT ignition timing AMBT and a final knock limit ignition timing AKNOK are calculated through correction of the basic values by various values. For example, the MBT ignition timing AMBT and the knock limit ignition timing AKNOK change to timings on the advancement side as the coolant temperature THW falls. Therefore, the final MBT ignition timing AMBT and the final knock limit ignition timing AKNOK are calculated by correcting the aforementioned basic values based on the coolant temperature THW. Then, a value obtained by correcting the basic ignition timing ABASE by various correction values is set as a final ignition timing AFIN. Ignition is carried out at the set final ignition timing AFIN.

Besides, the control apparatus 300 performs catalyst warm-up control as a kind of engine control. This catalyst warm-up control is well-known control for heating up and activating the catalyst device 50 at an early stage at the time of cold start-up of the engine, and is performed, for example, as follows, although the detailed description thereof is omitted.

When the start-up of the internal combustion engine 11 is completed through the start of combustion of the air-fuel mixture in the combustion chamber 16 after the beginning of cold start-up of the engine, the control apparatus 300 starts catalyst warm-up control. When catalyst warm-up control is started, the control apparatus 300 calculates a retardation correction amount AR for correcting the aforementioned basic ignition timing ABASE through retardation based on a start-up coolant temperature THWs as the coolant temperature THW at the time of start-up of the engine. Incidentally, the coolant temperature THW at the timing when start-up of the internal combustion engine 11 is completed is the start-up coolant temperature THWs in the present embodiment. However, the coolant temperature THW at any other timing may be the start-up coolant temperature THWs as long as the internal combustion engine 11 is started up at that timing, for example, at a timing when cranking is started, at a timing when a request for start-up of the internal combustion engine 11 is made, etc. Besides, the retardation correction amount AR is a negative value. The post-correction ignition timing is set to a timing that is retarded as the value of the retardation correction amount AR decreases, namely, as the absolute value of the retardation correction amount AR increases.

Figure 2:
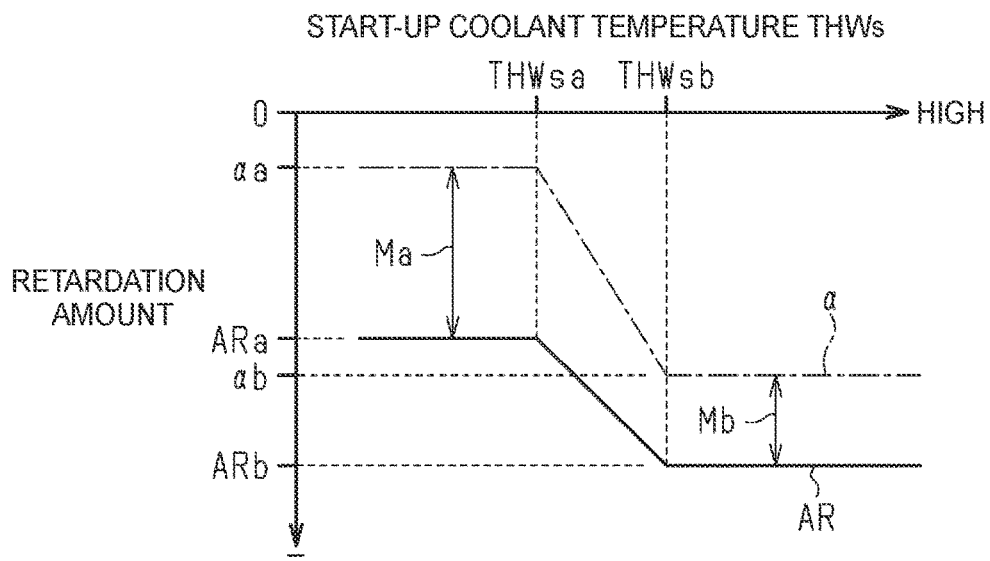
FIG. 2 is a graph showing a mode of setting a retardation correction amount and a determination value in the embodiment.

As indicated by a solid line in FIG. 2, when the start-up coolant temperature THWs is equal to or lower than a prescribed first temperature THWsa, a first retardation amount ARa that has been prescribed is set as the retardation correction amount AR. Then, when the start-up coolant temperature THWs is equal to or higher than a second temperature THWsb set higher than the aforementioned first temperature THWsa, a second retardation amount ARb that has been prescribed is set as the retardation correction amount AR. The value of this second retardation amount ARb is set smaller than the value of the aforementioned first retardation amount ARa. That is, the absolute value of the second retardation amount ARb is larger than the absolute value of the aforementioned first retardation amount ARa. Then, when the start-up coolant temperature THWs is between the first temperature THWsa and the second temperature THWsb, the retardation correction amount AR is set such that the retardation amount decreases as the start-up coolant temperature THWs rises, with the first retardation amount ARa and the second retardation amount ARb being a maximum value and a minimum value respectively.

In this manner, the retardation correction amount AR is set smaller, namely, to a negative value of which the absolute value is larger when the start-up coolant temperature THWs is high than when the start-up coolant temperature is low, such that the ignition timing is retarded by a larger value when the start-up coolant temperature THWs is high than when the start-up coolant temperature THWs is low. This is because of the following reason. In the case where the ignition timing is retarded by a large value when the start-up coolant temperature THWs is low, the combustion of the air-fuel mixture becomes unstable. Meanwhile, even in the case where the ignition timing is retarded by a large value when the start-up coolant temperature THWs is high, the combustion of the air-fuel mixture is unlikely to become unstable. It is thus advantageous to retard the ignition timing by a large value from the standpoint of warming up the catalyst device 50 at an early stage.

Then, the control apparatus 300 sets a value obtained by adding the retardation correction amount AR as a negative value to the basic ignition timing ABASE, as the final ignition timing AFIN, and raises the temperature of exhaust gas to activate the catalyst device 50 at an early stage by carrying out ignition at this final ignition timing AFIN.

Incidentally, when it can be determined that the catalyst device 50 has been warmed up, the control apparatus 300 ends catalyst warm-up control. It can be determined whether or not the catalyst device 50 has been warmed up, according to an appropriate method. For example, it may be determined that the catalyst device 50 has been warmed up when an integrated intake air amount after start-up of the engine reaches a predetermined amount. Alternatively, it may be determined that the catalyst device 50 has been warmed up when an elapsed time after start-up of the engine reaches a predetermined time. Alternatively, it may be determined that the catalyst device 50 has been warmed up when an integrated fuel injection amount after start-up of the engine reaches a predetermined amount. Alternatively, it may be determined that the catalyst device 50 has been warmed up when a temperature of the catalyst device 50 that has been grasped by being estimated, actually measured, etc. reaches a predetermined temperature.

It should be noted herein that when the final ignition timing AFIN that is set during the performance of catalyst warm-up control is not set to a value suitable for the warm-up of the catalyst device 50, the basic ignition timing ABASE as an ignition timing before correction through retardation is, for example, an excessively advanced value. Therefore, for example, in the case where the final ignition timing AFIN is not sufficiently retarded even when correction through retardation is carried out, the temperature of the catalyst device 50 may not be raised sufficiently. Besides, due to a requirement of, for example, ignition timing control other than catalyst warm-up control, the set final ignition timing AFIN may not be set to a value suitable for the warm-up of the catalyst device 50. Thus, the control apparatus 300 performs a process shown in FIG. 3, namely, a diagnosis process for diagnosing whether or not the aforementioned catalyst warm-up control based on retardation of the ignition timing is abnormal. Incidentally, the diagnosis process shown in the drawing is a process that is realized through the execution of the programs stored in the memory 300B of the control apparatus 300 by the CPU 300A. When the engine is started up, the control apparatus 300 starts this diagnosis process. Besides, step numbers will be expressed hereinafter by numerals preceded by "S".

Figure 3:
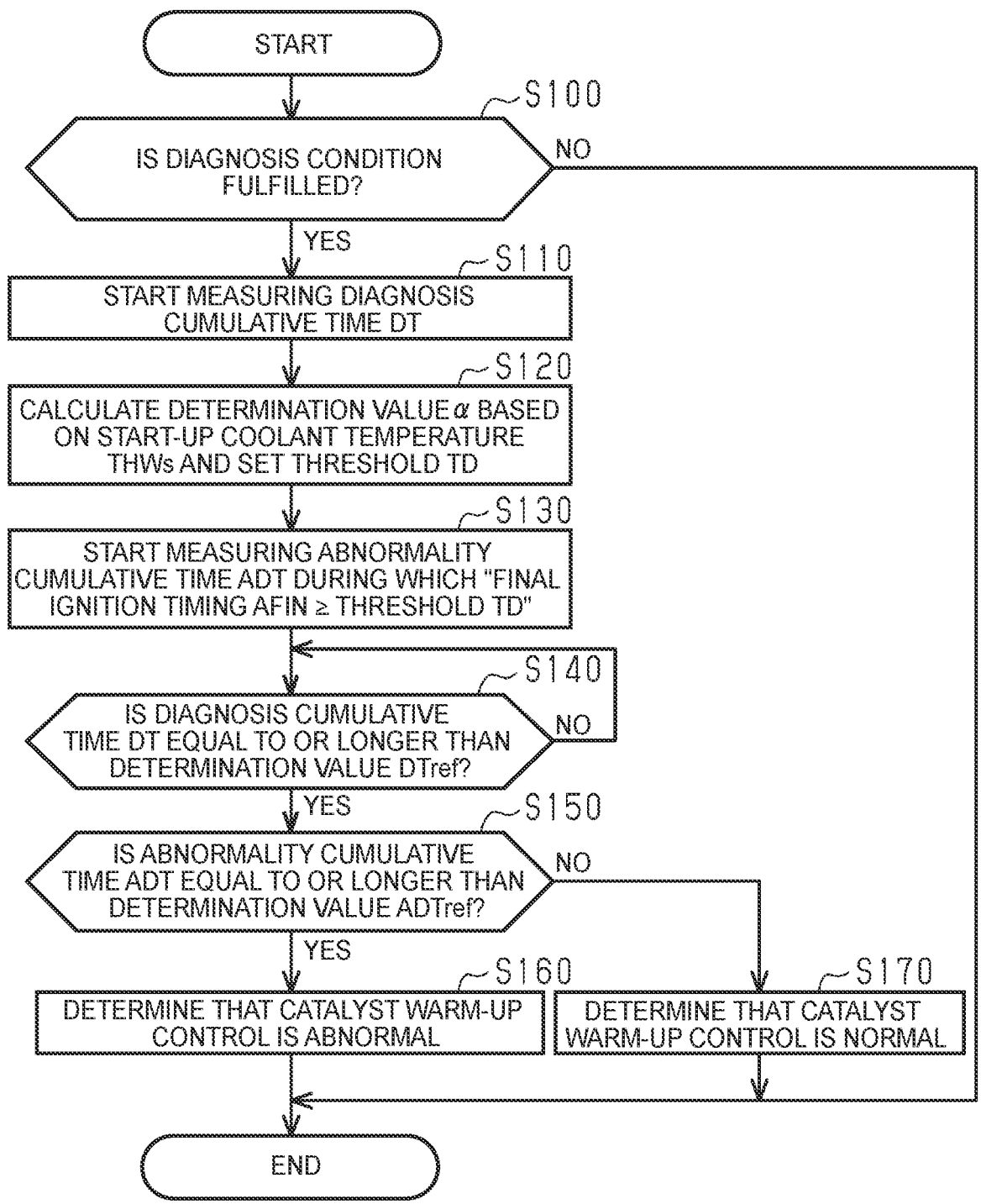
FIG. 3 is a flowchart showing a processing procedure that is carried out by the control apparatus according to the embodiment.

When the process shown in FIG. 3 is started, the control apparatus 300 determines whether or not a diagnosis condition is fulfilled (S100). In the present embodiment, it is determined that the diagnosis condition is fulfilled when catalyst warm-up control is performed. The control apparatus 300 determines that catalyst warm-up control is performed and that the diagnosis condition is fulfilled when various conditions, for example, a condition that the current coolant temperature THW is a value within a predetermined range and the cold start-up of the engine has been carried out, and a condition that the aforementioned retardation correction amount AR that is currently calculated is set to a value that is equal to or smaller than a predetermined value and that allows the catalyst device 50 to be warmed up at an early stage are all fulfilled.

If it is determined in S100 that the aforementioned diagnosis condition is not fulfilled (NO in S100), the control apparatus 300 ends the present process. On the other hand, if it is determined that the aforementioned diagnosis condition is fulfilled (YES in S100), the control apparatus 300 starts measuring a diagnosis cumulative time DT as a cumulative value of a time during which the aforementioned diagnosis condition is fulfilled (S110).

Subsequently, the control apparatus 300 performs a setting process for calculating a determination value $\alpha$ based on the start-up coolant temperature THWs, and setting a threshold TD through the use of this determination value $\alpha$ (S120). The determination value $\alpha$ is a negative value, and is a retardation amount of an ignition timing that is at least needed to hold the amount of exhaust emission equal to or smaller than a prescribed value by reliably warming up the catalyst device 50 through catalyst warm-up control.

The determination value $\alpha$ is the following value. That is, the value of the aforementioned retardation correction amount AR for performing catalyst warm-up control is reduced (the absolute value thereof is increased) as the start-up coolant temperature THWs rises as described above. Accordingly, as shown in FIG. 2, the aforementioned determination value $\alpha$ is also set smaller, namely, to a negative value of which the absolute value is larger when the start-up coolant temperature THWs is high than when the start-up coolant temperature THWs is low.

More specifically, as indicated by an alternate long and short dash line in FIG. 2, when the start-up coolant temperature THWs is equal to or lower than the aforementioned first temperature THWsa, a first determination value $\alpha$a as a prescribed retardation amount is set as the determination value $\alpha$. This first determination value $\alpha$a is a negative value that is larger than the aforementioned first retardation amount ARa, namely, a value of which the absolute value is smaller than the aforementioned first pretardation amount ARa.

Then, when the start-up coolant temperature THWs is equal to or higher than the aforementioned second temperature THWsb, a second determination value $\alpha b$ as a prescribed retardation amount is set as the determination value $\alpha$. This second determination value $\alpha b$ is also a negative value that is larger than the aforementioned second retardation amount ARb, namely, a negative value of which the absolute value is smaller than the absolute value of the aforementioned second retardation amount ARb.

Then, when the start-up coolant temperature THWs is between the first temperature THWsa and the second temperature THWsb, the determination value $\alpha$ is set such that the retardation amount decreases (the absolute value thereof increases) as the start-up coolant temperature THWs rises, with the first determination value $\alpha a$ and the second determination value $\alpha b$ being a maximum value and a minimum value respectively.

In this manner, when the start-up coolant temperature THWs remains the same, the determination value $\alpha$ is set to a value that is larger than the retardation correction amount AR by a predetermined margin M, namely, a value of which the absolute value is smaller than the retardation correction amount AR by the predetermined margin M. Moreover, the margin M is set larger when the start-up coolant temperature THWs is low than when the start-up coolant temperature THWs is high. More specifically, the margin M is a first margin Ma that has been prescribed when the start-up coolant temperature THWs is equal to or lower than the aforementioned first temperature THWsa.

Then, when the start-up coolant temperature THWs is equal to or higher than the aforementioned second temperature THWsb, the margin M is a second margin Mb that has been prescribed. This second margin Mb is smaller than the aforementioned first margin Ma.

Then, when the start-up coolant temperature THWs is between the first temperature THWsa and the second temperature THWsb, the margin M is set in such a manner as to decrease as the start-up coolant temperature THWs rises with the first margin Ma and the second margin Mb being a maximum value and a minimum value respectively.

Then, the control apparatus 300 calculates the threshold TD based on an expression (1) shown below.

$$\text{Threshold TD} = \text{Basic Ignition Timing ABASE} + \text{Determination Value } \alpha \quad (1)$$

The aforementioned threshold TD is set as a value for determining whether or not the final ignition timing AFIN is a timing that allows the amount of exhaust emission to be held equal to or smaller than a prescribed value by reliably warming up the catalyst device 50 through catalyst warm-up control.

It should be noted herein that the basic ignition timing ABASE changes in accordance with the engine operating state, and hence that the final ignition timing AFIN also changes in accordance with the engine operating state. Thus, in order to cause the threshold TD to follow changes in this final ignition timing AFIN, the threshold TD is set as a value obtained by adding the aforementioned determination value $\alpha$ to the basic ignition timing ABASE (TD=ABASE+$\alpha$). The threshold TD is an ignition timing that is retarded as the determination value $\alpha$ decreases, namely, as the absolute value of the determination value $\alpha$ as a negative value increases.

Incidentally, the determination value $\alpha$ is a value that is larger than the retardation correction amount AR by the aforementioned margin M, namely, a value of which the absolute value is smaller than the retardation correction amount AR by the aforementioned margin M. Accordingly, the threshold TD as a value obtained by adding the determination value $\alpha$ to the basic ignition timing ABASE is a value set to a timing that is more advanced than the ignition timing that is set during the performance of catalyst warm-up control, namely, the ignition timing obtained by retarding the basic ignition timing ABASE by the retardation correction amount AR, by the aforementioned margin M.

Subsequently, the control apparatus 300 starts measuring an abnormality cumulative time ADT during which the diagnosis condition is fulfilled (S130). This abnormality cumulative time ADT is obtained as a cumulative time during which the final ignition timing AFIN is set to a timing advanced by the aforementioned threshold TD or more, namely, the catalyst device 50 is exposed to low-temperature exhaust gas. The rise in temperature of the catalyst device 50 is suppressed as this abnormality cumulative time ADT lengthens. Therefore, the state of the rise in temperature of the catalyst device 50 can be monitored based on the abnormality cumulative time ADT. The abnormality cumulative time ADT is calculated as a cumulative value of the time during which a conditional expression (2) shown below is established.

$$\text{Final Ignition Timing AFIN} \geq \text{Threshold TD} \quad (2)$$

When the advancement amount of the final ignition timing AFIN is too large, namely, when the retardation amount of the final ignition timing AFIN is insufficient, the aforementioned conditional expression (2) is established.

Subsequently, the control apparatus 300 determines whether or not the diagnosis cumulative time DT is equal to or longer than a determination value DTref (S140). In the present embodiment, for example, the determination value DTref is set to 10 seconds. However, a value other than 10 seconds may be set as the determination value DTref. Then, if the diagnosis cumulative time DT is shorter than the determination value DTref (NO in S140), the control apparatus 300 repeatedly performs the processing of S140 until the diagnosis cumulative time DT becomes equal to or longer than the determination value DTref.

If it is determined in S140 that the diagnosis cumulative time DT is equal to or longer than the determination value DTref (YES in S140), the control apparatus 300 determines whether or not the abnormality cumulative time ADT is equal to or longer than a determination value ADTref (S150). This determination value ADTref is a value for determining whether or not the temperature of the catalyst device 50 has been sufficiently raised. A time shorter than the aforementioned determination value DTref is set as this determination value ADTref. For example, although eight seconds is set as the determination value ADTref in the present embodiment, a value other than eight seconds may be set as the determination value ADTref.

Then, if it is determined that the abnormality cumulative time ADT is equal to or longer than the determination value ADTref (YES in S150), the time during which the final ignition timing AFIN is set to a timing advanced by the threshold TD or more is long. Therefore, the time during which the final ignition timing AFIN is normally corrected through retardation is short on the contrary, so it can be determined that the temperature of the catalyst device 50 has not been sufficiently raised. Therefore, the control apparatus 300 determines that the setting of the ignition timing through catalyst warm-up control is abnormal (S160), and ends the present process. Incidentally, when it is determined that catalyst warm-up control is abnormal, the control apparatus 300 performs a process of suspending catalyst warm-up control, but may perform processes other than this process.

On the other hand, if it is determined that the abnormality cumulative time ADT is shorter than the determination value ADTref (NO in S150), the time during which the final ignition timing AFIN is set to a timing advanced by the threshold TD or more is short. Therefore, the time during which the final ignition timing AFIN is normally corrected through retardation is long on the contrary, so it can be determined that the temperature of the catalyst device 50 has been sufficiently raised. Therefore, the control apparatus 300 determines that the setting of the ignition timing through catalyst warm-up control is normal (S170), and ends the present process. Incidentally, after performing the processing of S160 or the processing of S170, the control apparatus 300 resets the diagnosis cumulative time DT and the abnormality cumulative time ADT to "0".

The operation and effect of the present embodiment will be described.

(1) When the start-up coolant temperature THWs is low, the warm-up of the catalyst device 50 through exhaust gas immediately after the start-up of the engine is less likely to progress than when the start-up coolant temperature THWs is high, but the temperature of the catalyst device 50 eventually reaches an activation temperature due to exhaust gas, and the catalyst device 50 purifies exhaust gas. It should be noted herein that the possibility of erroneously diagnosing that catalyst warm-up control is abnormal is higher in the case where the aforementioned margin M at the time when the start-up coolant temperature THWs is low is made equal to the aforementioned margin M at the time when the start-up coolant temperature THWs is high than in the case where the aforementioned margin M at the time when the start-up coolant temperature THWs is low is made larger than the aforementioned margin M at the time when the start-up coolant temperature THWs is high, although the ignition timing is retarded through catalyst warm-up control under a low-temperature environment. Thus, in the present embodiment, the threshold TD is set such that the aforementioned margin M becomes larger when the start-up coolant temperature THWs is low than when the start-up coolant temperature THWs is high. Therefore, it can be restrained from being erroneously diagnosed that catalyst warm-up control is abnormal under a low-temperature environment.

(2) The aforementioned retardation correction amount AR is set such that the ignition timing is retarded by a larger value when the start-up coolant temperature THWs is high than when the start-up coolant temperature THWs is low. Accordingly, when the start-up coolant temperature THWs is low, the degree of correction of the ignition timing through retardation by catalyst warm-up control is smaller than when the start-up coolant temperature THWs is high, so the combustion of the air-fuel mixture can be restrained from becoming unstable through retardation of the ignition timing. Besides, when the start-up coolant temperature THWs is high, the degree of correction of the ignition timing through retardation by catalyst warm-up control is larger than when the start-up coolant temperature THWs is low, so the warm-up of the catalyst device 50 at an early stage through retardation of the ignition timing can be promoted.

(3) In the case where the diagnosis of abnormality in catalyst warm-up control is carried out by comparing the value itself of the ignition timing with the threshold, the ignition timing temporarily exceeds the threshold due to fluctuations in the ignition timing although the temperature of the catalyst device 50 has been sufficiently raised, so it may be erroneously diagnosed that catalyst warm-up control is abnormal. It should be noted herein that the state of rise in temperature of the catalyst device 50 can be monitored by calculating the cumulative time during which the ignition timing corrected through retardation by catalyst warm-up control is set to a timing advanced by the threshold TD or more, namely, the catalyst device 50 is exposed to low-temperature exhaust gas. Thus, in the present embodiment, the diagnosis of abnormality in catalyst warm-up control is carried out based on the cumulative time. In concrete terms, it is determined that catalyst warm-up control is not abnormal when the abnormality cumulative time ADT is shorter than the determination value ADTref, and it is determined that catalyst warm-up control is abnormal when the abnormality cumulative time ADT is equal to or longer than the determination value ADTref. Accordingly, it can be accurately diagnosed whether or not catalyst warm-up control is abnormal, without being influenced by fluctuations in the ignition timing.

Figure 4:
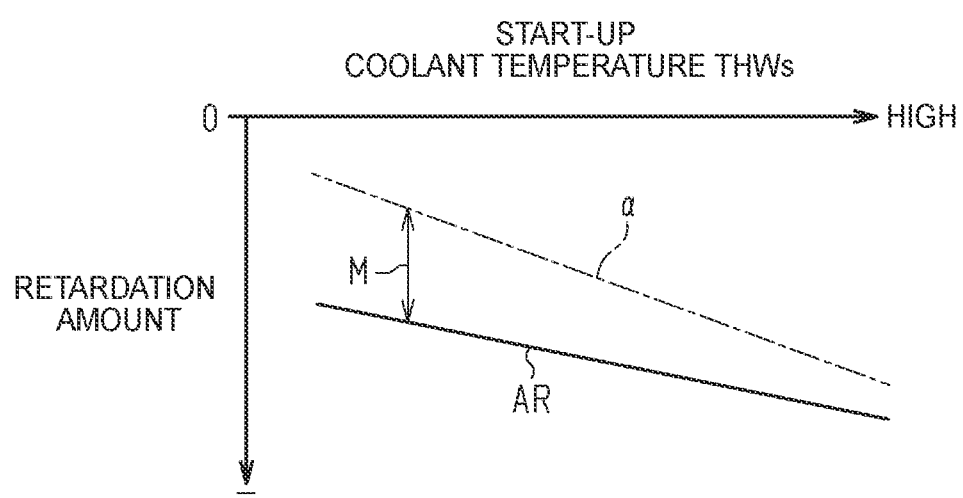
FIG. 4 is a graph showing a mode of setting a retardation correction amount and a determination value in a modification example of the embodiment.

Incidentally, the present embodiment can be carried out after being modified as follows. The present embodiment and the following modification examples can be carried out in combination with one another within such a range that no technical contradiction occurs. As shown in FIG. 4, each of the retardation correction amount AR and the determination value α may be a continuously variable value that decreases as the start-up coolant temperature THWs rises. Incidentally, in this modification example as well, the aforementioned margin M is set in such a manner as to increase as the start-up coolant temperature THWs falls.

It is diagnosed whether or not catalyst warm-up control is abnormal by comparing the abnormality cumulative time ADT and the determination value ADTref with each other, but the diagnosis of abnormality may be carried out in other modes. For example, the number of times of the final ignition timing AFIN becoming equal to or exceeding the threshold TD is measured under the condition that it is determined that the diagnosis condition is fulfilled in S100 of FIG. 3. Then, when the measured number of times is equal to or larger than a prescribed value (e.g., a value equal to or larger than 1), it may be diagnosed that the setting of the ignition timing through catalyst warm-up control is abnormal. On the other hand, when the measured number of times is smaller than the prescribed value, it may be diagnosed that the setting of the ignition timing through catalyst warm-up control is normal.

What is claimed is:

1. A control apparatus for an internal combustion engine, the control apparatus comprising circuitry configured to:
    perform catalyst warm-up control for promoting warm-up of a catalyst device provided in an exhaust passage by correcting through retardation an ignition timing that is set based on an engine operating state by a retardation correction amount that is set based on a start-up coolant temperature of an internal combustion engine, at a time of cold start-up of the engine;
    perform a diagnosis process for determining whether or not the catalyst warm-up control is abnormal by determining whether or not the ignition timing that is set during performance of the catalyst warm-up control is a timing advanced by a threshold or more, wherein the threshold is a value that is set to a timing more advanced than the ignition timing that is set during performance of the catalyst warm-up control, by a predetermined margin; and perform a setting process for setting the threshold based on the start-up coolant temperature such that the predetermined margin becomes larger when the start-up coolant temperature is low than when the start-up coolant temperature is high.

2. The control apparatus for the internal combustion engine according to claim 1, wherein the retardation correction amount is set such that the ignition timing is retarded by a larger value when the start-up coolant temperature is high than when the start-up coolant temperature is low.

3. A method implemented in a control apparatus for an internal combustion engine, the method comprising:

performing catalyst warm-up control for promoting warm-up of a catalyst device provided in an exhaust passage by correcting through retardation an ignition timing that is set based on an engine operating state by a retardation correction amount that is set based on a start-up coolant temperature of an internal combustion engine, at a time of cold start-up of the engine;

performing a diagnosis process for determining whether or not the catalyst warm-up control is abnormal by determining whether or not the ignition timing that is set during performance of the catalyst warm-up control is a timing advanced by a threshold or more, wherein the threshold is a value that is set to a timing more advanced than the ignition timing that is set during performance of the catalyst warm-up control, by a predetermined margin; and performing a setting process for setting the threshold based on the start-up coolant temperature such that the predetermined margin becomes larger when the start-up coolant temperature is low than when the start-up coolant temperature is high.

\* \* \* \* \*